(12) United States Patent
Takeda (10) Patent No.: US 7,495,712 B2
(45) Date of Patent: Feb. 24, 2009

(54) TELEVISION WITH A DISK PLAYBACK FEATURE AND DISK PLAYBACK APPARATUS

(75) Inventor: Kenichi Takeda, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 636 days.

(21) Appl. No.: 11/173,513

(22) Filed: Jul. 2, 2005

(65) Prior Publication Data

US 2006/0018626 A1   Jan. 26, 2006

(30) Foreign Application Priority Data

Jul. 23, 2004   (JP) .............. 2004-215455

(51) Int. Cl.
*H04N 5/64* (2006.01)
*G11B 33/02* (2006.01)

(52) U.S. Cl. .............. 348/836; 720/643; 720/647; 360/99.06

(58) Field of Classification Search .......... 348/552, 348/836; 360/99.07, 99.02, 99.03, 99.06, 360/133, 86; 720/630–647; 16/382, 308
See application file for complete search history.

(56) References Cited

U.S. PATENT DOCUMENTS

| | | | | |
|---|---|---|---|---|
| 3,899,794 A * | 8/1975 | Brown, Jr. | ............... | 360/133 |
| 4,310,864 A * | 1/1982 | Patel et al. | ............... | 360/99.06 |
| 5,220,552 A * | 6/1993 | Yokoi et al. | ............... | 720/646 |
| 6,324,147 B2 * | 11/2001 | Kanatani et al. | ............ | 720/647 |
| 2004/0004785 A1 * | 1/2004 | Seo | .............. | 360/97.01 |
| 2005/0257231 A1 * | 11/2005 | Hibi | ............... | 720/647 |

FOREIGN PATENT DOCUMENTS

| | | |
|---|---|---|
| JP | H04-007595 U | 1/1992 |
| JP | 10-46911 | 2/1998 |
| JP | 2002-008356 A | 1/2002 |

OTHER PUBLICATIONS

Japan Notice of the reason for refusal, dated Jun. 30, 2007.

* cited by examiner

*Primary Examiner*—M. Lee
(74) *Attorney, Agent, or Firm*—Yokoi & Co., U.S.A., Inc.; Peter Ganjian (57) ABSTRACT

Disclosed is a television with a disk playback feature, in which the convenience of the slot-in mechanism is preserved and a disk can be unloaded without being damaged by the lid body. A critical point is established on the path of turning of the second point of application of spring force. By the urging force of the torsion spring, the pivoting door can be forced to either open or close the slot, subject to whether or not the second point is beyond the critical point. The slot can be closed positively by the door plate before the second point reaches the critical point. Once the second point goes beyond the critical point, the pivoting door can be swung open without being thrust by the disk. Therefore, resistance during disk unloading is reduced and it can be prevented that a disk is damaged by touching with the door plate.

12 Claims, 9 Drawing Sheets

TELEVISION WITH A DISK PLAYBACK FEATURE AND DISK PLAYBACK APPARATUS

BACKGROUND OF THE INVENTION

1. Field of the Invention

The present invention relates to a television with a disk playback feature and a disk playback apparatus, having a mechanism enabling slot-in disk loading.

2. Description of Prior Art

This kind of disk playback apparatus with a slot-in mechanism of prior art in which the urging force of a spring is always exerted in a direction to open a lid body is known (e.g., see Japanese Patent Application Laid-Open No. Hei 10-46911 (hereinafter referred t as patent document 1).

According to this slot-in mechanism, once the opening action of the lid body has started, the lid body opening is completed by the urging force of the spring. This can ensure the loading and unloading of a CD or the like. Since the lid body must be kept closed against the urging force of the spring, a lock mechanism is provided to lock the closed lid body to the chassis. Therefore, to start the opening action of the lid body, it is necessary to at least unlock the lock mechanism.

However, in the slot-in mechanism, the above lid body obstructs a disk being unloaded outside directly from the chassis. In a possible worst case, a disk may be damaged by the impact of collision with the lid body when being unloaded. It is possible to unlock the lock mechanism beforehand to open the lid body so that the lid body will not obstruct disk unloading. However, this defeats the convenience of the slot-in mechanism.

An object of the present invention, which has been devised in view of the above-described problem, is to provide a television with a disk playback feature and a disk playback apparatus, in which the convenience of the slot-in mechanism is preserved and a disk can be unloaded without being damaged by the lid body.

SUMMARY OF THE INVENTION

To achieve the foregoing object, one aspect of the present invention resides in a television with a disk playback feature comprising: a chassis with a slot for slot-in loading of a thin disk; a pivoting door to open and close the slot by turning; and an unloader to hold the disk and push it outside the chassis, the pivoting door comprising: a roughly plate-like door plate which closes the slot opening upward and is thrust by the top edge of the disk pushed upward by the unloader, to turn in a direction to open the slot by being raised backward, opposite to the display face of a monitor mounted to the chassis; a cushion mechanism formed on the backside of the door plate to provide a larger area where the top edge of the disk hits on the door plate; a pair of arms which overhangs to one side inside the chassis from both ends of the door plate; and a pair of pivots which protrudes outward from each of the arms and is fit in a pair of bearings provided on the ceiling of the chassis. Each arm is equipped with a torsion spring, one end of which is supported at a first point of application of spring force, established to be fixed to the chassis, the other end of which is supported at a second point of application of spring force, established in the arm, wherein the torsion spring exerts its urging force between both its ends. On the path of turning of the second point of application of spring force as the pivoting door turns by being thrust by the top edge of the disk pushed out by the unloader, a critical point exists at which each pivot is aligned with the line of action of the urging force of the torsion spring applied to the second point of application of spring force.

By the turning of the pivoting door, the slot for slot-in loading of a thin disk can be opened and closed. The unloader can hold and push the disk outside the chassis. The pivoting door has the roughly plate-like door plate and the pair of arms overhangs to one side inside the chassis from both ends of the door plate. The pair of pivots protrudes from each of the arms inside the chassis and is fit in the pair of bearings provided on the ceiling of the chassis. Through this arrangement, the pivoting door can be turned on the pivots fixed to the chassis.

The door plate closes the slot which is top open and is thrust by the top edge of the disk, when the disk hits on it, pushed outside by the unloader, to turn in a direction to open the slot. That is, by unloading the disk by the unloader, the pivoting door can be turned to open the slot so as to be raised backward, opposite to the display face of the monitor mounted to the chassis. The cushion mechanism is formed on the backside of the door plate to provide a larger area where the top edge of the disk hits on the door plate. This cushion mechanism distributes the impact of hitting of the top edge of the disk on the door plate and can prevent damage to the disk.

The first point of application of spring force is established and this point is fixed to the chassis. The second point of application of spring force is established in each arm of the pivoting door. Each arm is equipped with the torsion spring, one end of which is supported at the first point of application of spring force and the other of which is supported at the second point of application of spring force. This torsion spring is formed to have an urging force exerted between its both ends. By this arrangement, the urging force of the torsion spring can be exerted on the pivoting door.

As the pivoting door turns by being thrust by the top edge of the disk pushed out by the unloader, the second point of application of spring force established in the pivoting door arm moves along a given path of turning. On this path, the critical point at which the pivot is aligned with the line of action of the urging force of the torsion spring applied to the second point of application of spring force is established. That is, as the disk is unloaded by the unloader, the second point of application of spring force will pass the critical point.

At the critical point, the pivot is aligned with the line of action of the urging force of the torsion spring applied to the second point of application of spring force. Therefore, at this time, the second point of application of spring force can turn on the pivot, but a moment to rotate the second point is not produced by the urging force of the torsion spring applied to the second point. When the second point of application of spring force is at a position above or below the critical point, the pivot is not aligned with the line of action of the urging force of the torsion spring applied to the second point of application of spring force. Consequently, a moment to rotate the second point is produced, forcing the pivoting door to turn in either opening or closing direction.

The direction in which the pivoting door is forced to turn above the critical point is opposite to that direction below the critical point. Therefore, before the second point of application of spring force passes the critical point, the pivoting door can be forced to turn in the direction to close the slot. Once the second point of application of spring force has passed the critical point, the pivoting door can be forced to turn in the direction to open the slot. By this mechanism, as the disk is unloaded by a predetermined distance, its top edge thrusts the pivoting door forced by the spring to close the slot beforehand and moves the door arms up to the critical point. Beyond the critical point, the pivoting door can be turned to open the slot completely only by the urging force of the torsion spring. That is, the slot can be closed positively before an unload operation and opened positively during an unload operation. Of course, when a disk is unloaded, the load applied to the disk in thrusting the door plate can be reduced.

Another aspect of the present invention resides in a disk playback apparatus comprising a chassis with a slot for slot-in loading of a thin disk and a pivoting door to open and close the slot by turning, the pivoting door comprising: a roughly plate-like door plate which closes the slot; a pair of arms which overhangs to one side inside the chassis from both ends of the door plate; and a pair of pivots which protrudes outward from each of the arms and is fit in a pair of bearings provided on the ceiling of the chassis. Each arm is equipped with a torsion spring, one end of which is supported at a first point of application of spring force, established to be fixed to the chassis, the other end of which is supported at a second point of application of spring force, established in the arm, wherein the torsion spring exerts its urging force between both its ends. On the path of turning of the second point of application of spring force from an open position to a closed position of the slot, a critical point exists at which each pivot is aligned with the line of action of the urging force of the torsion spring applied to the second point of application of spring force.

By the turning of the pivoting door, the slot for slot-in-loading of a thin disk can be opened and closed. The pivoting door has the roughly plate-like door plate and the pair of arms overhangs from both ends of the door plate. The pair of pivots protrudes from each of the arms and is fit in the pair of bearings provided on the ceiling of the chassis. Through this arrangement, the pivoting door can be turned on the pivots fixed to the chassis.

The first point of application of spring force is established and this point is fixed to the chassis. The second point of application of spring force is established in each arm of the pivoting door. Each arm is equipped with the torsion spring, one end of which is supported at the first point of application of spring force and the other of which is supported at the second point of application of spring force. This torsion spring is formed to have an urging force exerted between its both ends. By this arrangement, the urging force of the torsion spring can be exerted on the pivoting door.

As the pivoting door turns from the closed position to the open position of the slot, the second point of application of spring force established in the pivoting door arm moves along a given path of turning. On this path, the critical point at which the pivot is aligned with the line of action of the urging force of the torsion spring applied to the second point of application of spring force is established.

At the critical point, the pivot is aligned with the line of action of the urging force of the torsion spring applied to the second point of application of spring force. Therefore, at this time, the second point of application of spring force can turn on the pivot, but a moment to rotate the second point is not produced by the urging force of the torsion spring applied to the second point. When the second point of application of spring force is at a position above or below the critical point, the pivot is not aligned with the line of action of the urging force of the torsion spring applied to the second point of application of spring force. Consequently, a moment to rotate the second point is produced, forcing the pivoting door to turn in either opening or closing direction.

The direction in which the pivoting door is forced to turn above the critical point is opposite to that direction below the critical point. Therefore, before the second point of application of spring force passes the critical point, the pivoting door can be forced to turn in the direction to close the slot. Once the second point of application of spring force has passed the critical point, the pivoting door can be forced to turn in the direction to open the slot. By this mechanism, the pivoting door forced by the spring to close the slot beforehand can be turned to open the slot completely only by the urging force of the torsion spring. That is, the slot can be closed positively under a predetermined condition and the slot can be opened positively.

As described above, according to the present invention, a television with a disk playback feature and a disk playback apparatus, in which the convenience of the slot-in mechanism is preserved and a disk can be unloaded without being damaged by the lid body, can be provided.

In yet another aspect of the present invention, the apparatus in question may be configured such that an unloader to hold the disk and push it outside the chassis is provided inside the chassis and, as the top edge of the disk pushed outward by the unloader hits on and thrusts the door plate, the door plate is turned in the direction to open the slot and then the second point of application of spring force reaches the critical point.

As the disk is unloaded from the chassis by the unloader, the second point of application of spring force will pass the critical point. Consequently, the slot can be closed positively before an unload operation and opened positively during an unload operation. Of course, when a disk is unloaded, the load applied to the disk in thrusting the door plate can be reduced.

By this mechanism, a disk can be ejected by the unloader, while the slot is opened.

In yet another aspect of the present invention, the apparatus in question may be configured such that a cushion mechanism is provided over a region where the top edge of the disk hits on the backside of the door plate to mitigate the impact of the hitting of the top edge on the door plate.

Because the impact of the hitting of the disk top edge on the door plate can be mitigated, damage to the disk can be prevented.

In a further aspect of the present invention, the apparatus in question may be configured such that the cushion mechanism is a structure formed to provide a larger area where the top edge of the disk hits on the door plate.

In consequence, the top edge of the disk hits on the larger area of the backside of the door plate. This distributes the impact of the hitting of the top edge of the disk on the door plate and can prevent damage to the disk.

Thereby, damage to a disk can be prevented with a simple structure.

In a still further aspect of the present invention, the apparatus in question may be configured such that the cushion mechanism is formed of a shock-absorbing material covering the region where the top edge of the disk hits on the door plate.

By covering the region where the top edge of the disk hits on the door plate with a shock-absorbing material, the impact of the hitting of the disk top edge on the door plate can be mitigated.

Thereby, damage to a disk can be prevented more positively.

DESCRIPTION OF THE PREFERRED EMBODIMENTS

Figure 1:
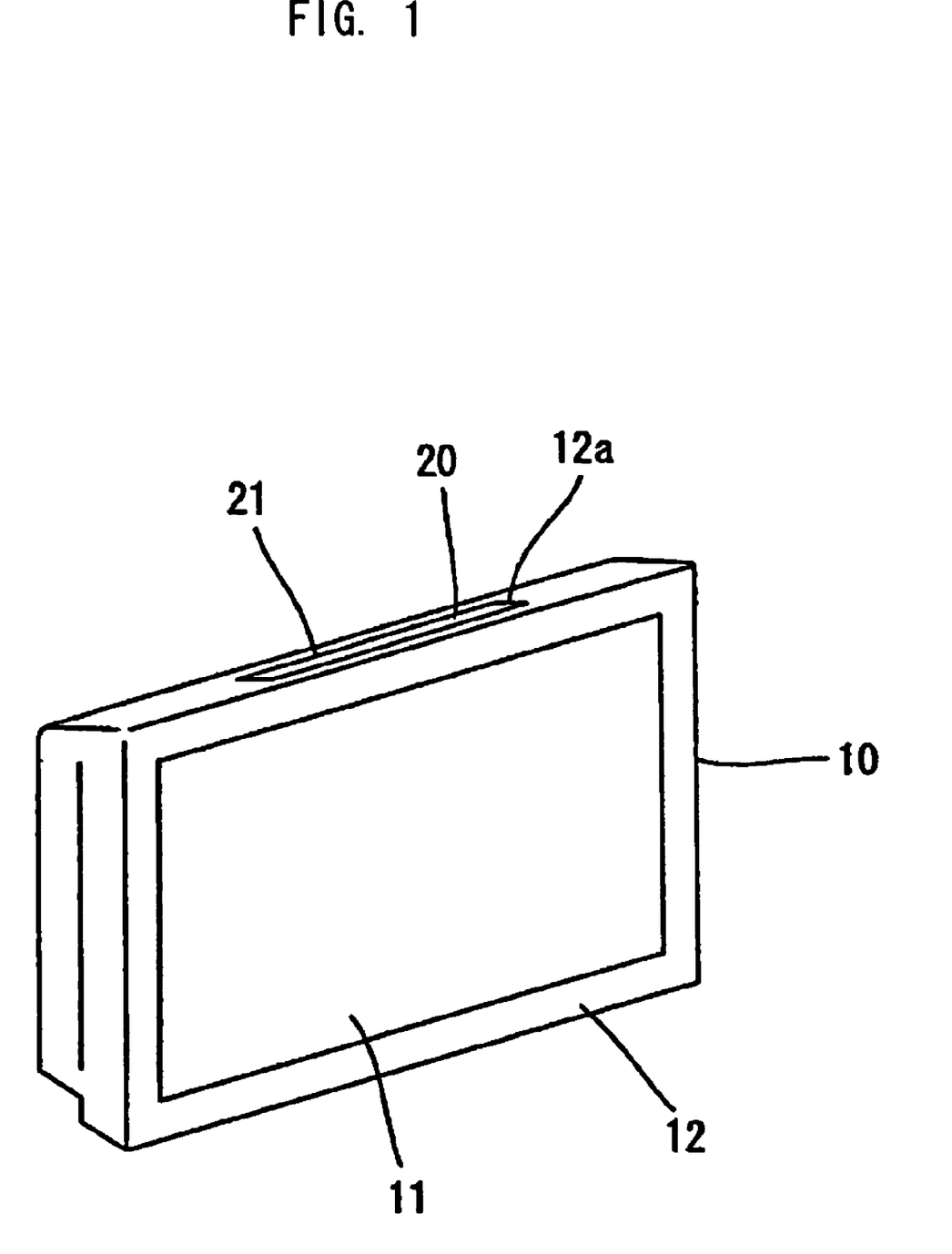
FIG. 1 is a perspective view of a liquid crystal display television.

FIG. 1 shows a perspective view of a liquid crystal display television with a disk playback feature as a disk playback apparatus embodied according to the present invention. The present invention can be applied to any similar device at least having a mechanism enabling slot-in disk loading and can also be applied to a device having the disk playback feature as its main function such as a DVD player. The slot-in mechanism, the subject matter of this invention, may be built into another device like the liquid crystal display television with a disk playback feature and can also be applied to a disk drive or the like of a personal computer or the like. Of course, this mechanism can be applied to a device having a writing function or the like other than the playback feature. The present invention can be applied to a device for retrieval from any kind of disk that is thin and can be slotted in, involving CD, CD-R, CD-RW, DVD, MD, and FD, and from various types of memory cards and the like.

In FIG. 1, the liquid crystal display television 10 has a roughly rectangular chassis 12 constructed with thin plates. The chassis 12 is placed in a roughly upright posture by a supporting stand, a wall-hanging mechanism, or the like, not shown, and has a rectangular opening in its front when being placed upright. A liquid crystal panel 11 is fit over the opening and an image can be reproduced on the liquid crystal panel 11.

On the top surface of the chassis 12, a rectangular slot 12a which is elongated along the width of the chassis is formed and the internal space of the chassis 12 opens into the external through the slot 12a. A pivoting door 20 is installed within the slot 12a and the slot 12a is covered by a roughly plate-like door plate 21 of the pivoting door 20. The pivoting door 20 is rotatably installed to the chassis 12. When the pivoting door 20 turns, the door plate turns at the entrance of the slot 12a. Thereby, the slot 12a can be opened and closed.

Figure 2:
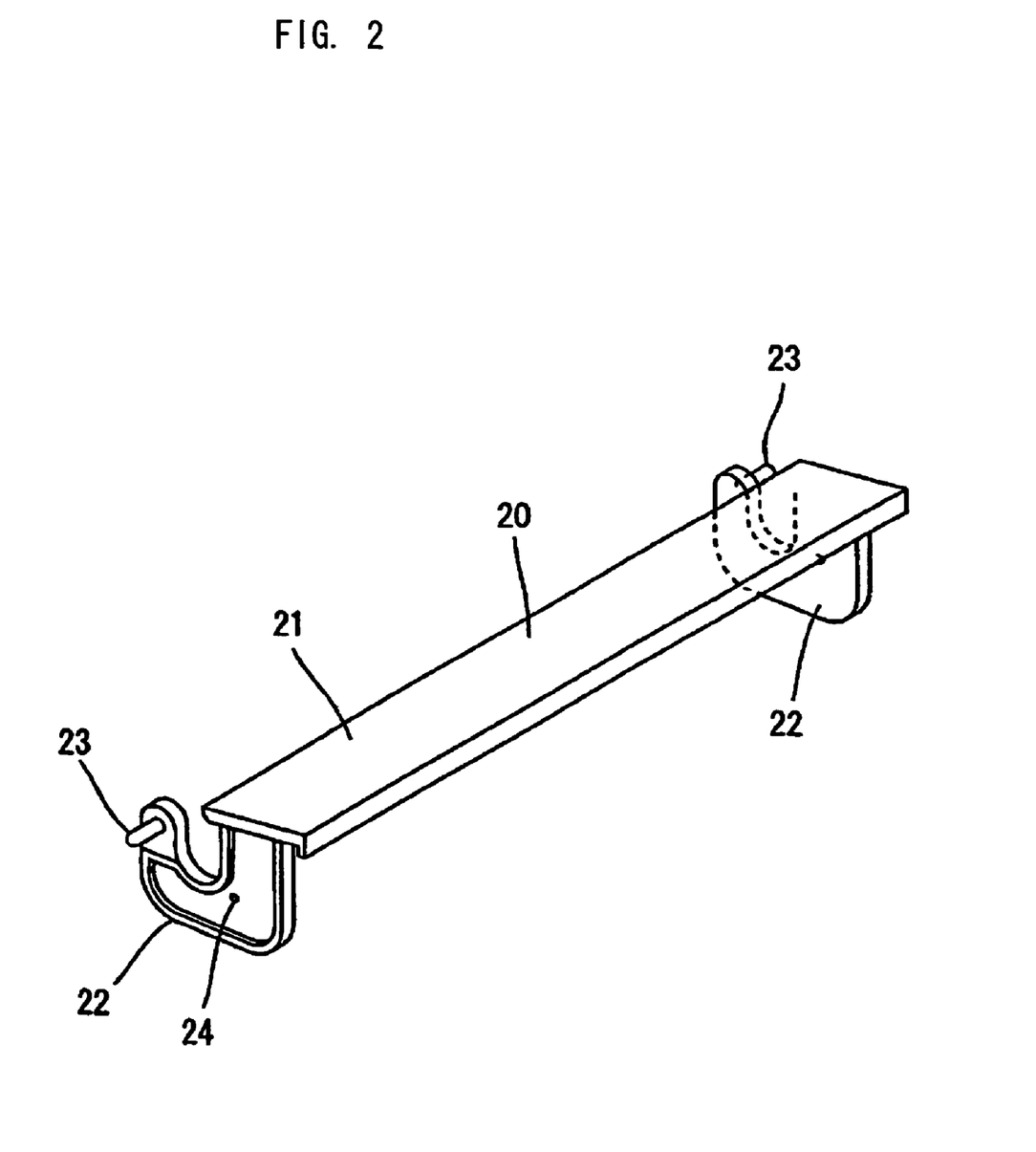
FIG. 2 is a front view of a pivoting door.
Figure 3:
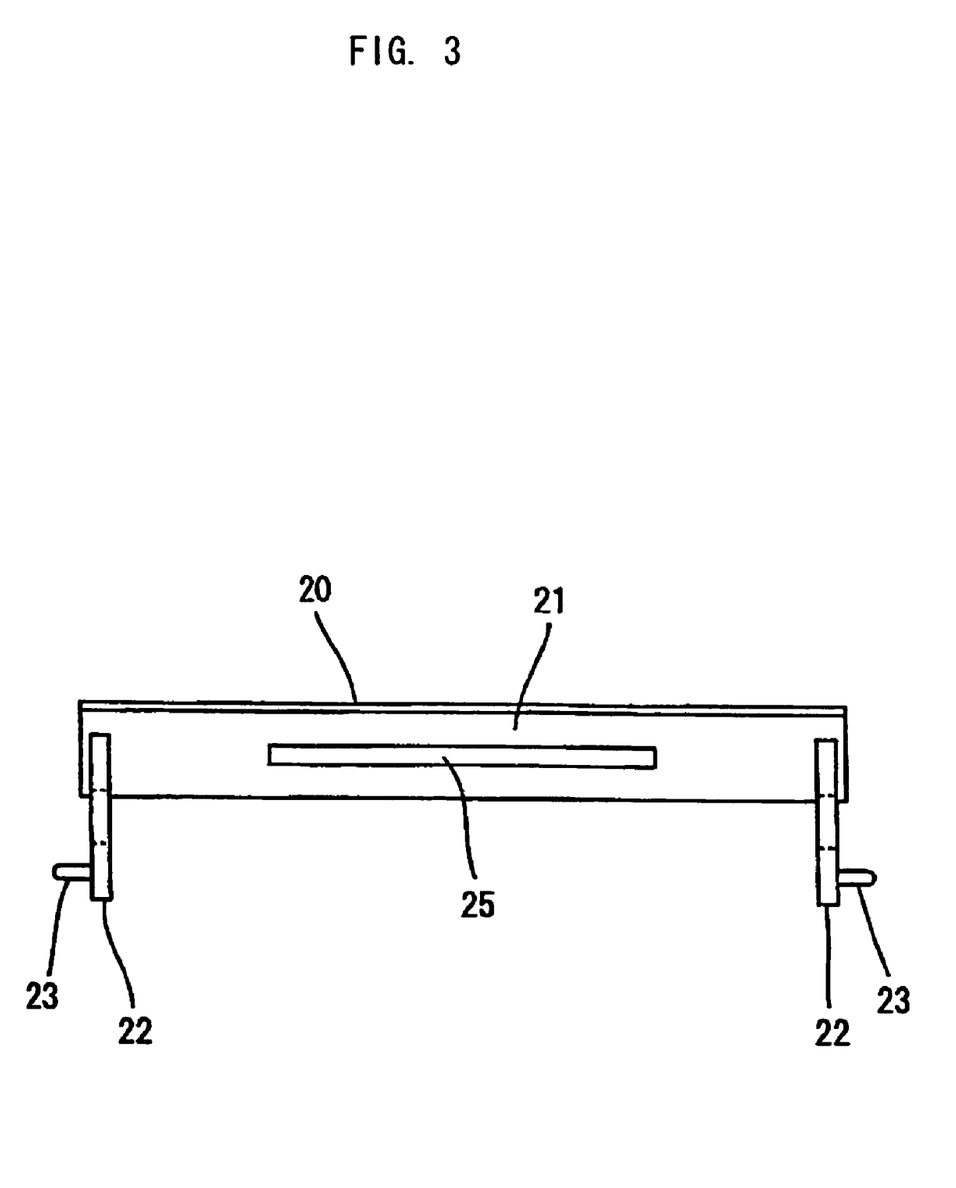
FIG. 3 is a backside view of the pivoting door.

FIG. 2 shows a perspective view of the pivoting door 20. This drawing shows the pivoting door 20 removed from the chassis 12. The pivoting door 20 has the door plate 21 which is roughly plate-like and formed with dimensions slightly smaller than the slot 12a and a pair of arms 22 overhangs to one side from both longitudinal ends of the door plate. Both arms 22 are formed in a roughly U shape and, at their ends which are not joined to the door plate 21, roughly cylindrical pivots 23 each projecting outward in either direction of the width of the chassis is formed. On one arm 22, a circular hole 24 is formed, positioned a predetermined distance from the pivot 23. In the above drawing, the front side of the door plate 21 is defined as facing upward. FIG. 3 shows a backside view of the door plate 21 of the pivoting door 20. In this drawing, a chine-like protrusion member 25 elongated along the width of the chassis is formed on the backside of the door plate 21.

Figure 4:
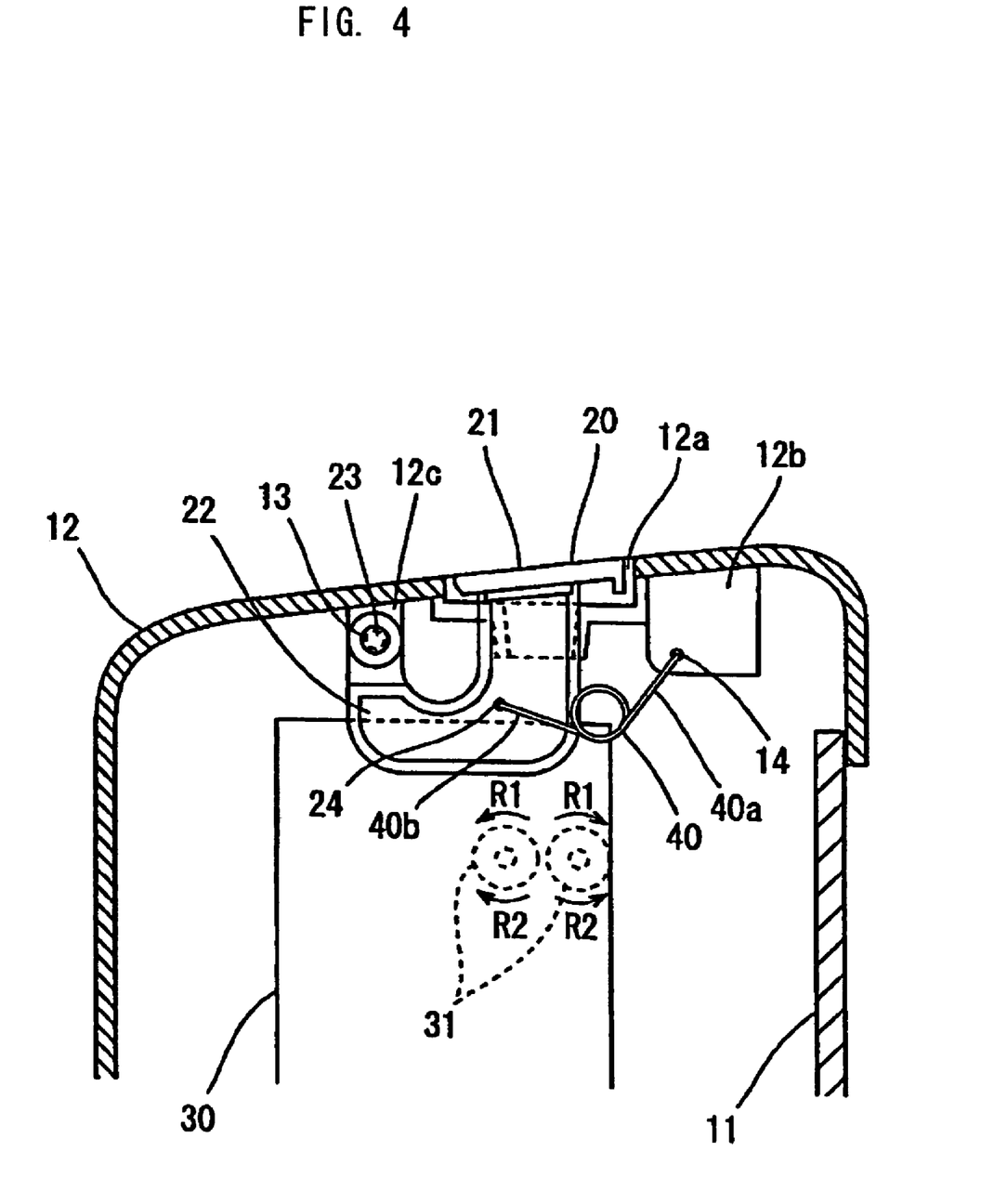
FIG. 4 is a cross-sectional view of the liquid crystal display television.

FIG. 4 shows a cross-sectional view of the liquid crystal display television 10. This drawing shows an enlarged view of an upper part of a cross section of the television when the chassis of the television 10 is cut perpendicularly to its width direction at a point outward of and just near to one end of the door plate 21 along the width of the chassis. In this drawing, the chassis is hollow and an open space is provided inside to its front. The liquid crystal panel 11 is installed to provide a view from this open space to the front of the television. The slot 12a is formed on the top surface of the chassis 12. Forward of the slot 12a, a fixing piece 12b is formed, protruding inside from the ceiling of the chassis 12. Rearward of the slot 12a, a bearing piece 12c extends from the ceiling of the chassis 12, protruding inside.

In the protrusion of the bearing piece 12c, a bearing hole 13 is formed with its diameter being slightly larger than the diameter of the pivot 23. A DVD drive unit 30 is housed inside the chassis 12. The DVD drive unit 30 is formed in a roughly box-like shape and equipped with at least a disk chuck mechanism, a disk rotating mechanism, and an optical reading mechanism, etc. therein. The DVD drive unit 30 is also equipped with a loader to guide a DVD disk or CD disk into the drive and an unloader to eject the disk outside.

The loader/unloader for putting a disk in place and ejecting it can be provided by, for example, employing a pair of rollers 31 that can move to come into contact with each other and back to their original positions as well as being rotatable. When the rollers 31 first get closer and come into contact with each other, they can nip and hold a disk from both sides. Then, when the rollers 31 rotate in a direction of R1, they can unload the disk upward; when they rotate in a direction or R2, they can load the disk downward.

When unloading a disk, for example, in response to an eject button operation, the disk chuck mechanism moves the disk to a position proper for being nipped between the rollers which are initially separate in their original positions. Upon detection of the disk set in the proper position, the roller 31 are moved to come into contact with each other and can hold and unload the disk. When the disk has moved out by a predetermined distance until projecting a predetermined distance from the slot 12a of the chassis 12, the rollers 31 stop. Then, the disk will be removed by hand by the user. The distance by which the disk is projected from the slot 12a of the chassis 12 until the rollers 13 stop is properly set to eject the disk so that the chuck hole provided in the center of the disk goes out completely from the slot 12a.

Because this allows the user to get his or her finger through the chuck hole and pick up the disk, the disk is easy to remove. The optical reading mechanism is located so that a laser beam for reading passes from the rear to the forward. Therefore, a disk is handled with its writing side facing to the rear and its label side facing to the forward. This allows the user to visually check the label on the face of a disk while handing the disk, thus making it easy to identify the disk. Because the writing side is always oriented to a certain direction, a possibility that the user touches the writing side improperly when handling the disk by hand with the disk face toward the user can be reduced.

When loading a disk, the user puts the disk into the slot 12a. After dropping by a predetermined distance, the disk is held by the rollers 31 moved to come into contact with each other from their original separate positions. Then, when the rollers 31 rotate in the direction of R2, the disk can be loaded into the DVD drive unit 30. Because the slot 12a is formed with dimensions larger than the diameter and thickness of a disk, a disk in an upright posture can be loaded and unloaded through the slot 12a.

In FIG. 4, the pivoting door 20 is fastened to the chassis 12 by fitting the pivot 23 at each end thereof in the bearing hole 13. Although not shown, the pivot 23 at the other end of the door plate is also fit in the other bearing hole. In consequence, the pivoting door 20 can turn on the pivots 23. Since the pair of pivots 23 is formed to be aligned on a common axis, a common axis of rotation can be provided by the pivots 23.

Figure 5:
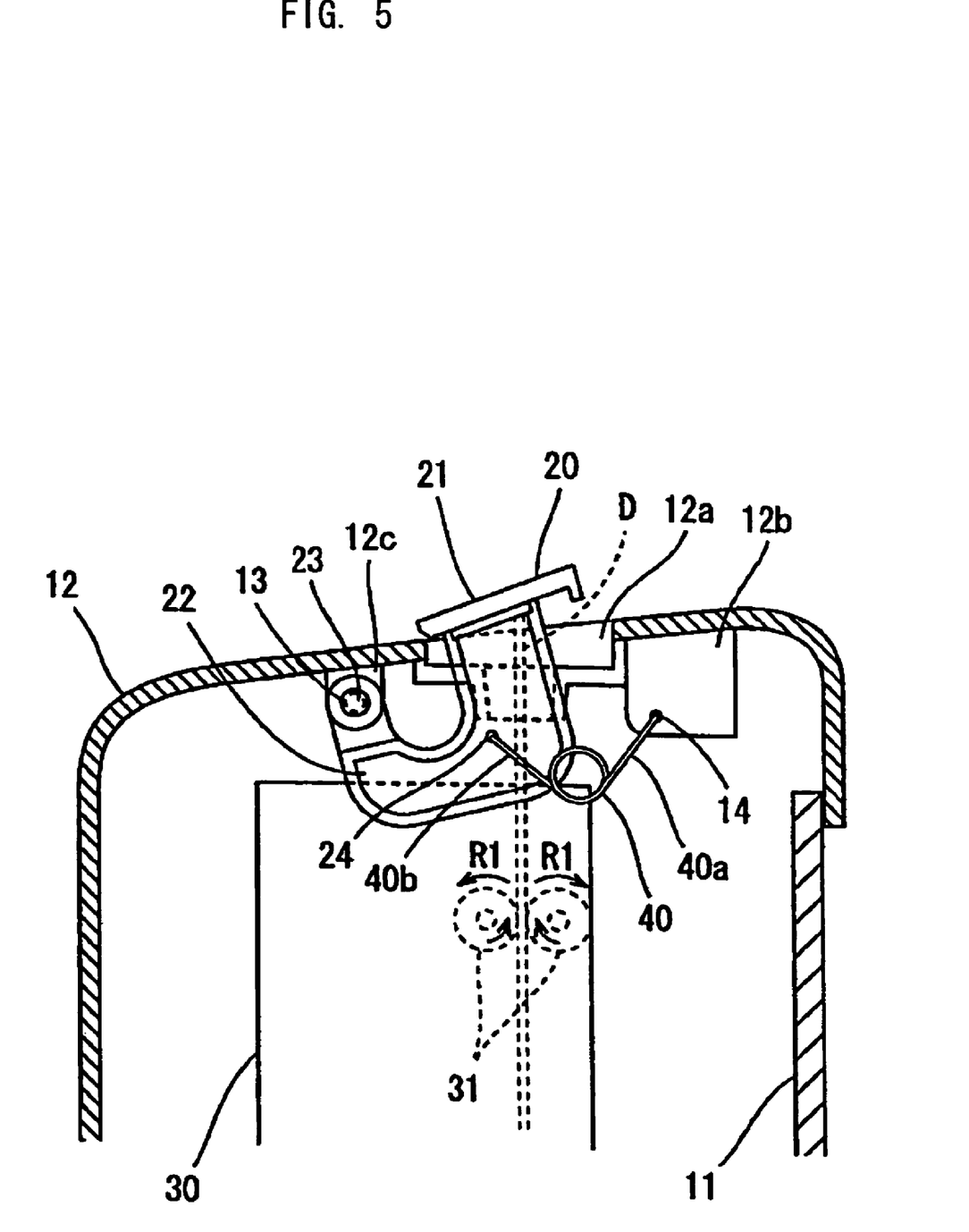
FIG. 5 is a cross-sectional view of the liquid crystal display television.
Figure 6:
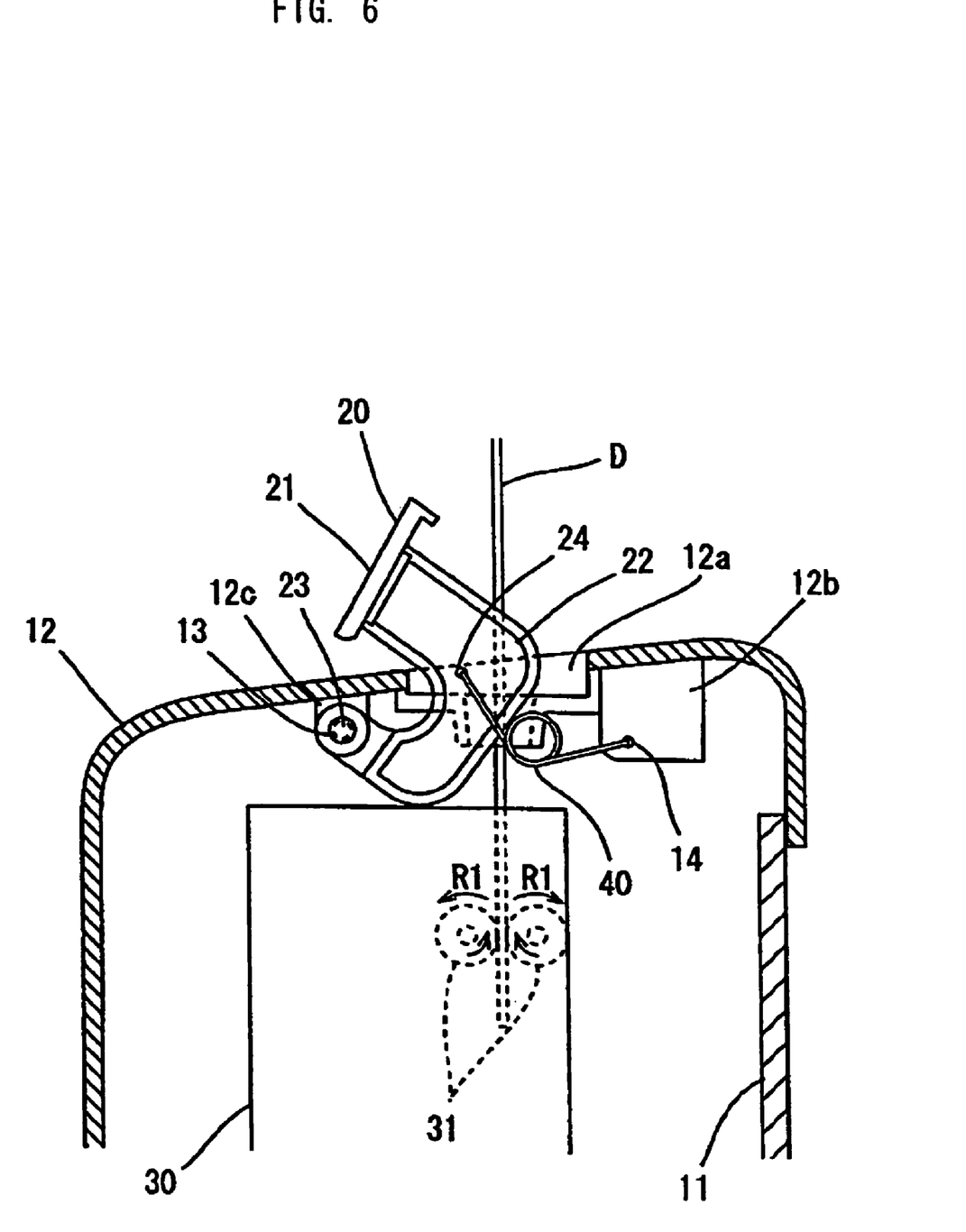
FIG. 6 is a cross-sectional view of the liquid crystal display television.

The pivoting door 20 is coupled to the fixing piece 12b extension of the chassis 12 via a torsion spring 40 formed of a metal wire wound into a given shape. The torsion spring 40 is formed by a circular coil section 40 with both ends 40a, 40b extending straightly in tangent directions of the coil section. One end 40a of the torsion spring 40 is press fit in a circular hole 14 provided in the fixing piece 12b and the other end 40b is press fit in a hole 24 provided in the arm 22. The holes 14, 24 in which both ends 40a, 40b of the torsion spring 40 are press fit are formed larger than the diameter of the wire of the torsion spring 40 and both ends 40a, 40b of the torsion spring 40 can turn in the holes 14, 24. The torsion spring 40 has its urging force applied in a direction in which both ends 40a, 40b of the torsion spring 40 form an obtuse angle FIGS. 5 and 6 depict the unloading of a disk. In FIG. 5, the rollers 31 hold a disk D from both sides and push the disk upward as they rotate in the direction R1. The top edge of the disk D pushed upward then comes to touch the door plate 21 and thrusts the door plate 21 upward. As the door plate 21 is thrust up, the pivoting door 20 is flipped open in a manner that the door plate 21 is raised backward, opposite to the display face of the liquid crystal panel 11. Since the pivoting door 20 is installed rotatably, it can be opened not to obstruct the unloading of the disk D. Because the arms 22 are separated a distance larger than the diameter of the disk D, it does not happen that the disk being unloaded is interfered with the arms 22 or gets stuck between the arms.

On the other hand, in FIG. 6, the top edge of the disk D does not touch the door plate 21. This indicates that the pivoting door 20 is swung open to open the slot 12a by the urging force of the torsion spring 40 rather than the force of the thrust exerted on the door plate 21 by the top edge of the disk D. As the pivoting door 20 turns to a certain angle, the door plate 21 is gradually raised and positioned closer to the writing side of the disk D. If the top edge of the disk D continues to touch the door plate 21, the door plate 21 will touch the writing side of the disk D and damage it.

When the pivoting door 20 has turned to a certain angle, the door plate 21 is flipped open by the urging force of the torsion spring 40. That is, the top edge of the disk D no longer needs to touch and thrust the door plate 21; instead, the urging force of the torsion spring 40 can flip the door plate 21 open. In consequence, the disk D will be no longer touching the door plate 21 and, therefore, damaging the writing side of the disk D can be prevented. While the pivoting door 20 starts to turn by the thrust on the door plate 21 by the top edge of the disk D in a state depicted in FIG. 5, the pivoting door 20 is swung open by the urging force of the torsion spring 40 in a state depicted in FIG. 6.

Prior to the state depicted in FIG. 5, the pivoting door 20 does not turn to open the slot 12a until the top edge of the disk D touches the door plate 21. In other words, the urging force of the torsion spring 40 acts to keep the slot 12a closed by the pivoting door 20. Therefore, unless unloading of a disk D is performed, the slot 12a can be kept closed and dust or the like can be prevented from entering the inside of the chassis 12.

The following will describe a condition for switching from the state in which the urging force of the torsion spring 40 acts on the pivoting door 20 to keep the slot 12a closed by the door plate 21 to the state in which the urging force of the torsion spring 40 acts on the pivoting door 20 so that the door plate 21 is swung open to open the slot 12a.

Figure 7:
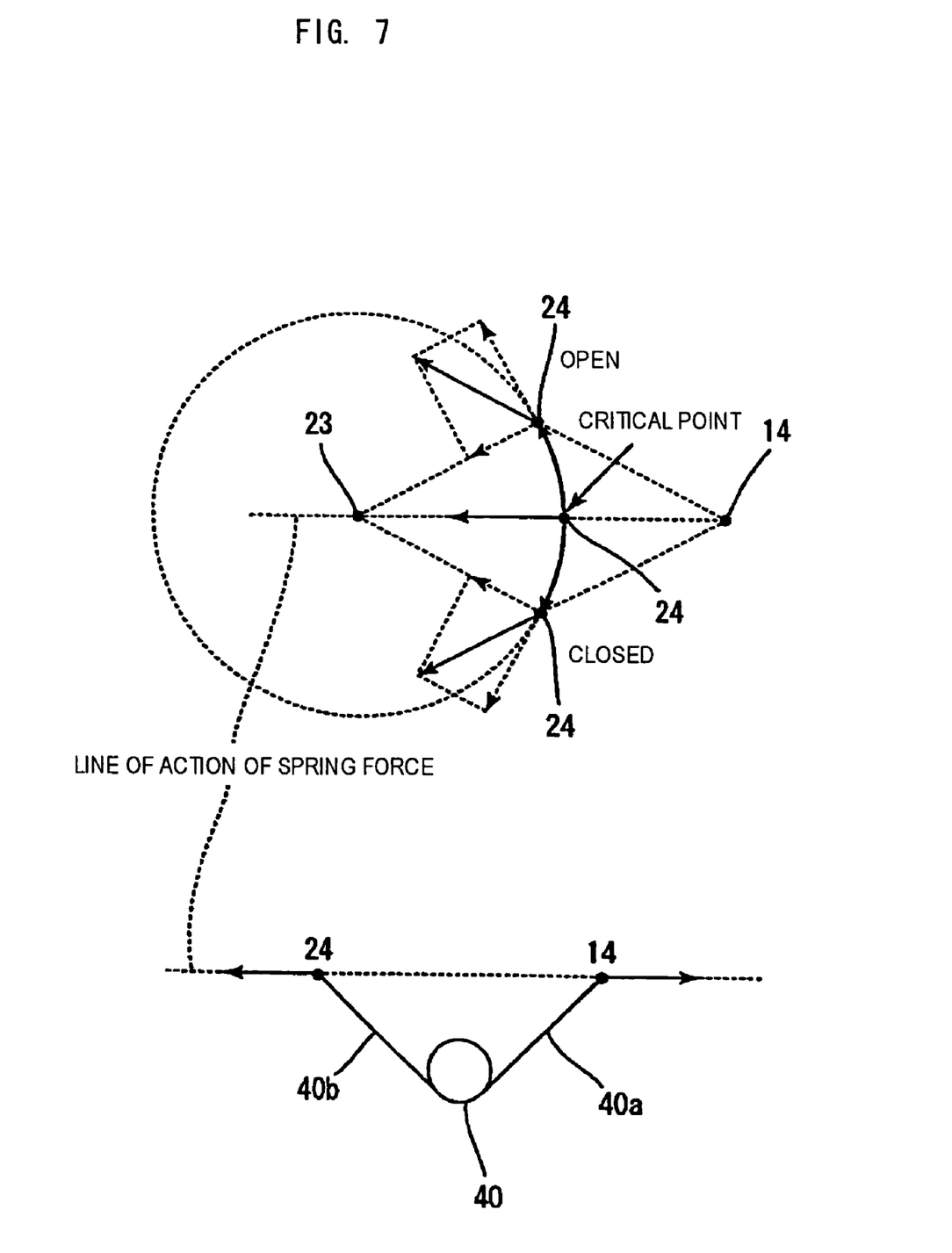
FIG. 7 schematically shows how a spring force acts during the turning of the pivoting door.

FIG. 7 schematically shows the turning of the pivoting door 20. In this drawing, the center of a dotted circle represents a pivot 23. A slid-line arc on the circumference of the dotted circle indicates the path along which the hole 24 moves during the turning of the pivoting door 20. On the other hand, the hole 14 is denoted by a point outside the dotted circle. Although the torsion spring 40 is not shown in the upper drawing, the urging force of the torsion spring 40 acts in a direction to separate both the holes 14, 24 outward on a line (referred to as the line of action of spring force; the same shall apply hereinafter) connecting the holes 14, 24 at which both ends 40a, 40b of the torsion spring 40 are supported, as shown in the lower drawing. Although the magnitude of the urging force varies, depending on the amount of compression of the torsion spring 40, the above-described relation between the positions of the holes and the direction of the urging force can be considered to remain unchanged.

Since the urging force of the torsion spring 40 is applied to the positions of the holes 14, 24, here, the hole 14 is referred to as a first point of application of spring force and the hole 24 as a second point of application of spring force. While the first point 14 and the second point 24 of application of spring force are forced to separate each other on the line of action of spring force connecting these points, as described above, the turning of the pivoting door 20 displaces the second point 24. That is, the second point 24 of application of spring force is displaced along the solid-line arc. On the other hand, the first point 14 of application of spring force is not displaced, because it lies in the fixing piece 12b extension internally from the chassis 12.

When the second point 24 of application of spring force is at a position referred to as a critical point, the pivot 23 is positioned on the line of action of spring force connecting the first point 14 and the second point 24 of application of spring force. At this time, the line connecting the second point 24 of application of spring force and the pivot 23 coincides with the direction of the urging force of the torsion spring 40. In this state, the urging force of the torsion spring 40 and the compression stress on the arm 22 linking the second point 24 of application of spring force and the pivot 23 can be balanced, because their directions are aligned on the same line. At this time, a tangential force of the urgent force does not occur with the arc corresponding to the path of the second point 24 of application of spring force and, therefore, there does not occur a moment that rotates the second point 24 of application of spring force on the pivot 23.

When the second point 24 of application of spring force is at a position below the critical point, the line connecting the second point 24 of application of spring force and the pivot 23 is not aligned with the direction of the urging force of the torsion spring 40. At this time, a part of the urging force can be balanced with the compression stress on the arm 22, but the remaining part thereof becomes a tangential force at that position on the arc corresponding to the path of the second point 24 of application of spring force. Therefore, a moment that rotates the second point 24 of application of spring force on the pivot 23 takes place and the pivoting door 20 is forced to keep the slot 12a closed. Therefore, as this drawing indicates, when closing the slot 12a, by positioning the second point 24 of application of spring force below the critical point, the pivoting door 20 can be forced to keep the slot 12a closed.

When the second point 24 of application of spring force is at a position above the critical point, the line connecting the second point 24 of application of spring force and the pivot 23 is not aligned with the direction of the urging force of the torsion spring 40. In this case also, a part of the urging force can be balanced with the compression stress on the arm 22, but the remaining part thereof becomes a tangential force at that position on the arc corresponding to the path of the second point 24 of application of spring force. Therefore, a moment that rotates the second point 24 of application of spring force on the pivot 23 takes place and the pivoting door 20 is forced to open the slot 12a. Therefore, as this drawing indicates, when opening the slot 12a, by positioning the second point 24 of application of spring force above the critical point, the pivoting door 20 can be forced to open the slot 12a.

In this manner, by the urging force of the torsion spring 40, the pivoting door 20 can be forced to either open the slot 12a or keep the slot 12a closed, subject to whether or not the second point 24 of application of spring force is beyond the critical point. When a disk D is unloaded, its top edge thrusts the door plate 21. By setting the distance by which the door plate 21 is displaced by the thrust of the top edge of the disk D at least greater than the distance by which the second point 24 of application of spring force is displaced from its initial closed position until reaching the critical point, the thrust of the top edge of the disk D can be switched to the urging force of the torsion spring 40 to flip the door plate 21 open, while the top edge of the disk D is still thrusting the door plate 21.

In other words, if the second point 24 of application of spring force comes to the critical point along its path of turning, while the pivoting door 20 turns by being thrust by the top edge of the disk D pushed out by the rollers 31 as the unloader, the thrust of the top edge of the disk D can be switched to the urging force of the torsion spring 40 to flip the door plate 21 open. As described above, provided that the doorplate 21 can be swung open by the urging force of the torsion spring 40, it becomes unnecessary that the top edge of the disk D touches the door plate 21. Thus, it does not happen that the disk D is damaged by the door plate 21. After the disk D is removed by hand, the pivoting door 20 is still forced to open the slot 12a. Thus, it does not happen that the pivoting door 20 is closed improperly. Of course, it is not needed to open the pivoting door 20 beforehand when unloading a disk. Thus, there is no trouble of defeating the convenience of the slot-in mechanism.

Setting the distance by which the door plate 21 is displaced by the thrust of the top edge of the disk D greater than the distance by which the second point 24 of application of spring force is displaced from its initial closed position until reaching the critical point can be accomplished by setting the rate of moving the disk D out by the rollers 31 as the unloader greater. On the other hand, after loading a disk D, by lightly pushing the door plate 21 back, the second point 24 of application of spring force goes back from the open position to the critical point. Then, the slot 12a can be closed by the urging force of the torsion spring 40. Below the critical point, the urging force of the torsion spring 40 acts in a direction to keep the slot closed. Thus, it does not happen that the turning of the pivoting door 20 stops midway. Without the provision of a mechanism for latching the pivoting door 20 closed, the slot 12a is closed positively and incursion of dust or the like can be prevented surely.

Figure 8:
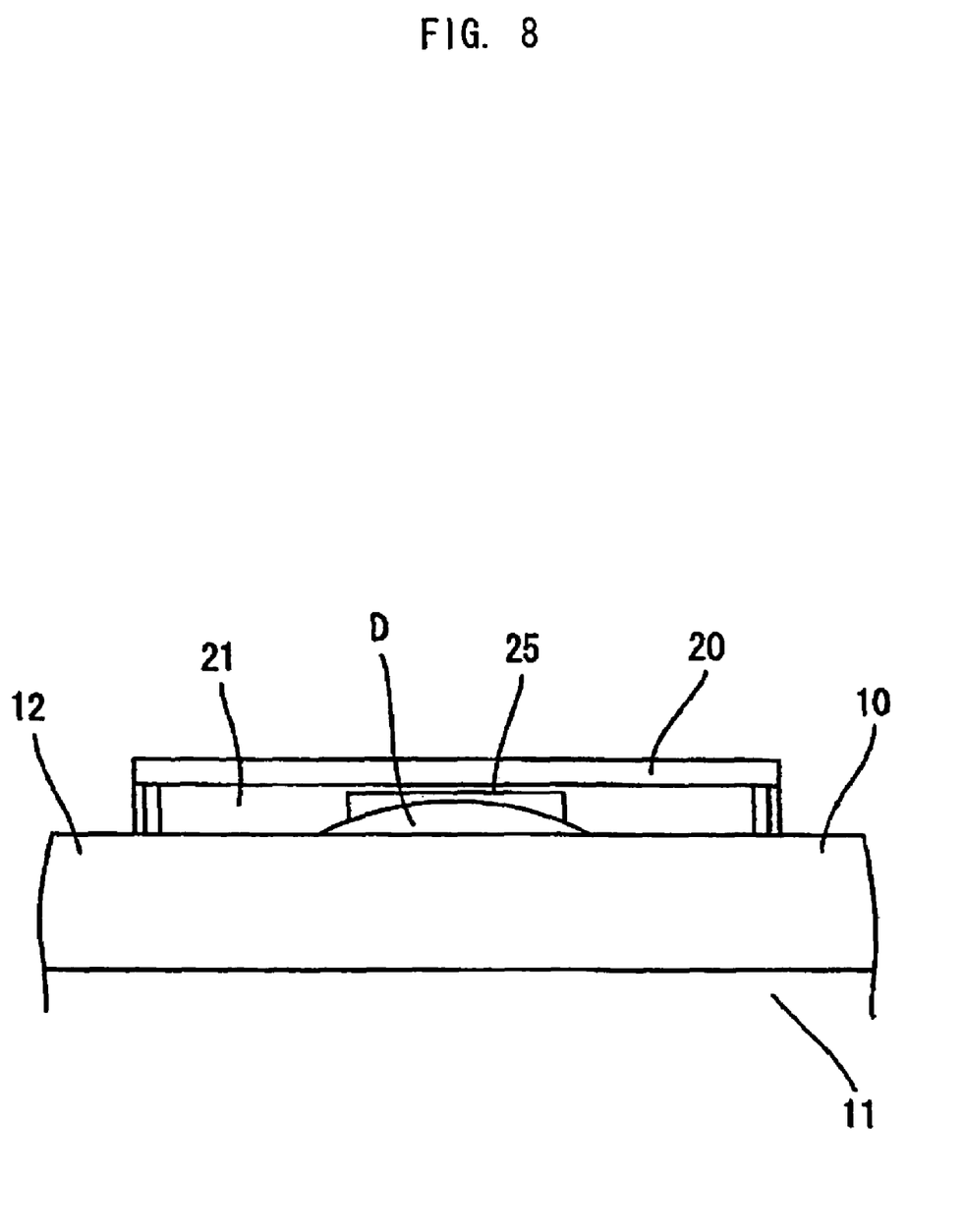
FIG. 8 is a front view of the liquid crystal display television.
Figure 9:
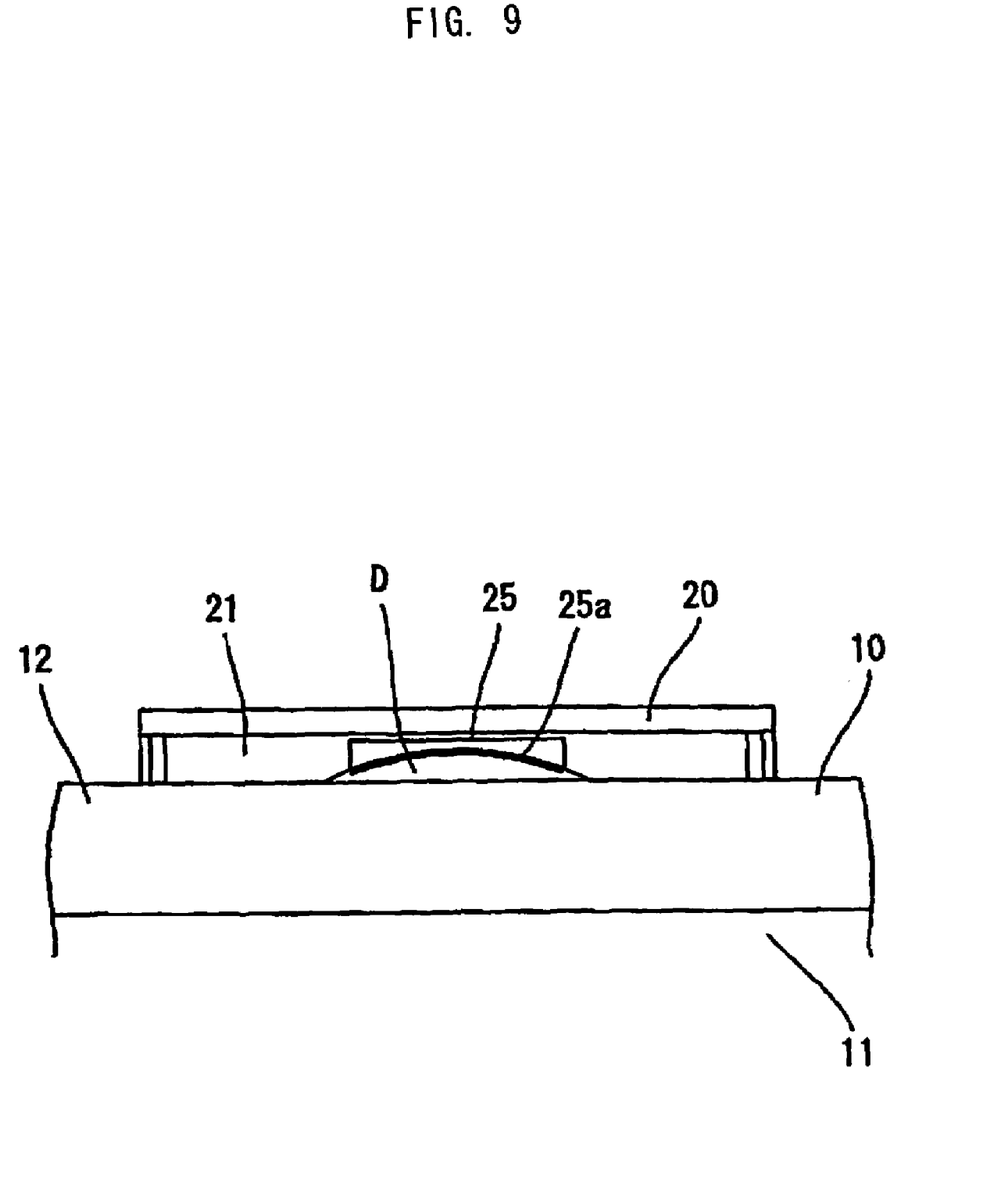
FIG. 9 is a front view of the liquid crystal display television.

FIG. 8 shows a front view of the liquid crystal display television 10 in the state depicted in FIG. 5. In FIG. 8, the protrusion member 25 which is concaved to mate with the curvature of the outer circumference of a disk D is formed on the backside of the door plate 21. When a disk D is unloaded, its outer edge hits on the protrusion member 25 provided as a cushion mechanism. This enables the disk outer edge to hit on a larger area in the backside of the door plate 21 and shock can be distributed widely; consequently, it can be prevented that the edge of a disk D is chipped. As is shown in FIG. 9, the protrusion member 25 may be covered by a shock-absorbing material such as cloth. As the shock-absorbing material, synthetic resin, cloth, etc, may be used. A hollow cushion structure or the like can also be applied.

As described above, a feature of the present invention resides in that a critical point is established on the path of turning of the second point 24 of application of spring force. By the urging force of the torsion spring 40, the pivoting door 20 can be forced to either open the slot 12a or keep the slot 12a closed, subject to whether or not the second point 24 of application of spring force is beyond the critical point. Consequently, the slot 12a can be closed positively by the door plate 21 before the second point 24 of application of spring force reaches the critical point. Once the second point 24 of application of spring force goes beyond the critical point, the pivoting door 20 can be swung open without being thrust by the disk D. Therefore, resistance during disk D unloading is reduced and it can be prevented that a disk D is damaged by touching with the door plate 21.

I claim:

1. A television with a disk playback feature comprising a chassis with a slot for slot-in loading of a thin disk, a pivoting door to open and close the slot by turning, and an unloader to hold said disk and push said disk outside said chassis, said pivoting door comprising:

a roughly plate-like door plate which closes said slot which is top open and is thrust by the top edge of said disk pushed upward by said unloader, to turn in a direction to open said slot by being raised backward, opposite to the display face of a monitor mounted to said chassis;

a cushion mechanism formed on the backside of said door plate to provide a larger area where the top edge of said disk hits on said door plate;

a pair of arms which overhangs to one side inside said chassis from both ends of said door plate; and a pair of pivots which protrudes outward from each of said arms and is fit in a pair of bearings provided on the ceiling of said chassis, wherein each arm is equipped with a torsion spring, one end of which is supported at a first point of application of spring force, established to be fixed to said chassis, the other end of which is supported at a second point of application of spring force, established in said arm, wherein the torsion spring exerts its urging force between both its ends, and wherein, on the path of turning of said second point of application of spring force as said pivoting door turns by being thrust by the top edge of said disk pushed out by said unloader, a critical point exists at which said each pivot is aligned with the line of action of the urging force of said torsion spring applied to the second point of application of spring force.

2. A disk playback apparatus comprising a chassis with a slot for slot-in loading of a thin disk and a pivoting door to open and close the slot by turning, said pivoting door comprising a roughly plate-like door plate which closes said slot;

a pair of arms which overhangs to one side inside said chassis from both ends of said door plate; and a pair of pivots which protrudes outward from each of said arms and is fit in a pair of bearings provided on the ceiling of said chassis, wherein each arm is equipped with a torsion spring, one end of which is supported at a first point of application of spring force, established to be fixed to said chassis, the other end of which is supported at a second point of application of spring force, established in said arm, wherein the torsion spring exerts its urging force between both its ends, and wherein, on the path of turning of said second point of application of spring force from an open position to a closed position of said slot, a critical point exists at which said each pivot is aligned with the line of action of the urging force of said torsion spring applied to the second point of application of spring force.

3. The disk playback device according to claim 2,
wherein an unloader to hold said disk and push said disk outside said chassis is provided inside said chassis, and
wherein, as the top edge of said disk pushed outward by said unloader hits on and thrusts said door plate, the door plate is turned in a direction to open said slot and then said second point of application of spring force reaches said critical point.

4. The disk playback device according to claim 3, wherein a cushion mechanism is provided over a region where the top edge of said disk hits on the backside of said door plate to mitigate the impact of the hitting of the top edge on the door plate.

5. The disk playback device according to claim 4, wherein said cushion mechanism is a structure formed to provide a larger area where the top edge of said disk hits on said door plate.

6. The disk playback device according to claim 4, wherein said cushion mechanism is formed of a shock-absorbing material covering the region where the top edge of said disk hits on said door plate.

7. The disk playback device according to claim 2, wherein said disk playback device is a liquid crystal display television having a roughly rectangular chassis constructed with thin plates, the chassis is placed in a roughly upright posture by a supporting stand, a wall-hanging mechanism, or the like and has a rectangular opening in its front when being placed upright, and a liquid crystal panel is fit in the opening and an image can be reproduced on the liquid crystal panel.

8. The disk playback device according to claim 7, wherein a DVD drive unit formed in a roughly box-like shape and equipped with a disk chuck mechanism, a disk rotating mechanism, and an optical reading mechanism, etc. is housed inside said chassis, the DVD drive unit is equipped with a loader to guide a DVD disk or CD disk into the drive and an unloader to eject the disk outside, and the loader/unloader is constituted of a pair of rollers that can move to come into contact with each other and back to their original positions as well as being rotatable, wherein, when the rollers get closer and come into contact with each other, they can nip and hold a disk from both sides, and the rollers unloads the disk upward when rotating in one direction and loads the disk downward when rotating in an opposite direction.

9. The disk playback device according to claim 8, wherein the critical point exists on the path of turning of the second point of application of spring force during the turning of the pivoting door being thrust by the top edge of a disk pushed out by the rollers as said unloader.

10. The disk playback device according to claim 2, wherein said spring consists of a torsion spring and switching occurs between a state where the pivoting door is forced by the urging force of the torsion spring so that said door plate closes the slot and a state where the pivoting door is forced so that the door plate is opened to open the slot.

11. The disk playback device according to claim 10, wherein, when said pivoting door has turned to a certain angle, said door plate is flipped open by the urging force of said torsion spring, and, at that time, said disk no longer needs to touch the door plate and thrust the door plate, instead, the urging force of the torsion spring flips the door plate open.

12. The disk playback device according to claim 10, wherein said torsion spring forms a circular coil section with both ends extending straightly in tangent directions of the coil section.

* * * * *